May 27, 1941.  C. O. BROWNE  2,243,084
OPTICAL PROJECTION APPARATUS
Filed Aug. 30, 1938
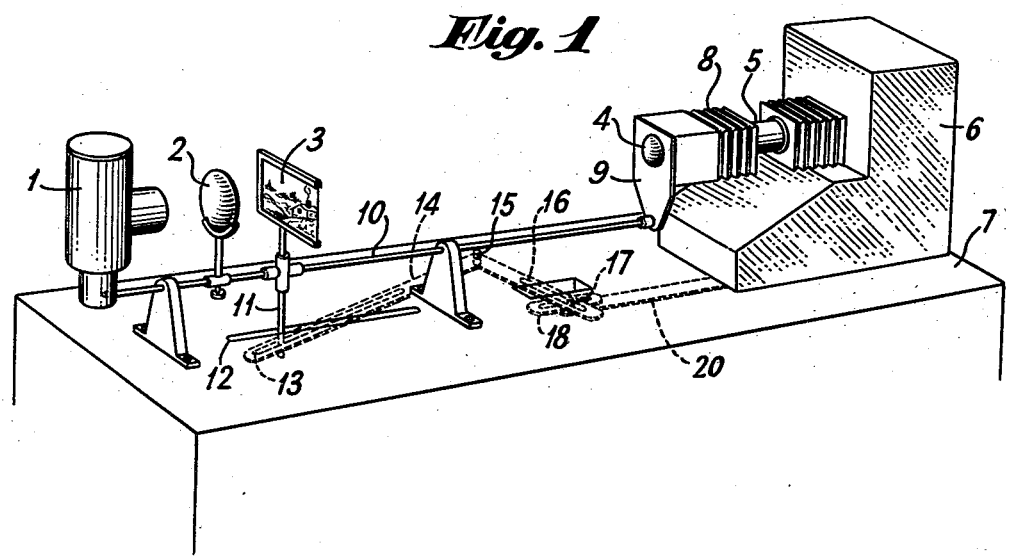
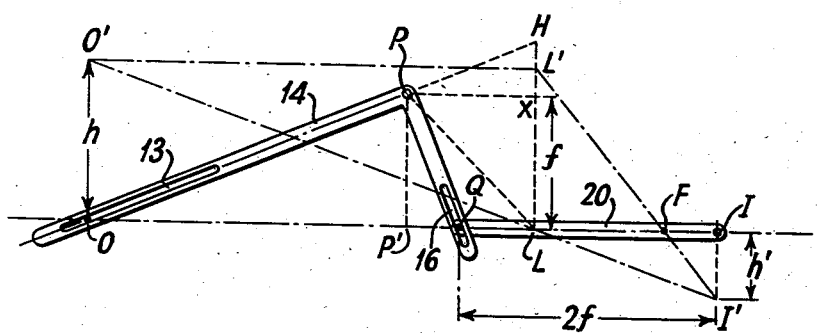
INVENTOR.
CECIL OSWALD BROWNE
BY
ATTORNEY.

Patented May 27, 1941

2,243,084

UNITED STATES PATENT OFFICE 2,243,084

OPTICAL PROJECTION APPARATUS

Cecil Oswald Browne, West Acton, London, England, assignor to Electric & Musical Industries Limited, Hayes, Middlesex, England, a company of Great Britain Application August 30, 1938, Serial No. 227,458
In Great Britain March 9, 1938

5 Claims. (Cl. 88—24)

The present invention relates to optical projection apparatus and more especially to projecting arrangements such as diascopes where an image is projected with variable magnification and has been developed primarily for use in a projection system which is intended to be used with a television transmission system.

The object of the invention is to provide an optical image projecting arrangement in which the magnification of the image can be varied readily while keeping the image in focus without varying the intensity of illumination of the image.

In a television transmission system it is important that the brightness and contrast of a picture to be transmitted shall be matched to the transmission system in order that the latter may not be overloaded or inefficiently operated. Thus in cases where it is desired to vary the magnification of the televised image of a subject viewed from time to time, it is important to arrange for the intensity of illumination of the subject to be varied in accordance with the magnification of the televised image.

According to the invention an arrangement for the optical projection of an image with variable magnification is provided comprising an image receiving device on or into which an image of an illuminated object may be projected, said object and said image receiving device and a projecting optical lens or system being adapted to be adjustably positioned with respect to each other and to means for illuminating said object, in such manner that when the arrangement is adjusted to produce in said device an image with altered magnification, the intensity of illumination of the image in respect of an object of uniform opacity remains substantially constant.

In the preferred embodiment of the invention illuminating means for the object comprise a source of illumination and a condensing lens arranged to produce an image of said source substantially on a projecting lens by which the desired image of said object is produced. The object is preferably supported on a movable support which is linked with the image receiving device in such manner that when one is moved, the other is moved automatically in such manner that the image remains in focus on or in the image receiving device. For example, the support for the object and the image receiving device may be linked by a lever having two arms bent at right angles and pivoted at the point of junction of the arms, movement being transmitted to or from said support and said image receiving device from or to points in each arm on a line at a distance from the pivotal point substantially equal to the focal length of the projection lens and parallel to the optical axis of the arrangement, the support and the image receiving device being actuated together by causing said lever to move and being connected to said lever by connecting means such that their distance apart is always equal to the sum of the separation of the two said points in the lever arms and twice the focal length of the lens.

The method of carrying the invention into effect will be readily understood from the following description with reference, by way of example, to the accompanying drawing in which:

Figure 1 is a diagrammatic perspective view of an arrangement embodying the invention, and Figure 2 is a diagram which will be referred to in explaining the operation of the arrangement of Figure 1.

Referring to Figure 1 it will be seen that the arrangement therein shown comprises a lamp house 1 the light from the lamp being collected by condenser lens 2 and directed on to a slide holder or the like 3 in which a transparency to be examined may be inserted. An image of the transparency is produced by fixed lens 4 in the objective lens system indicated at 5 by which an image is produced on the screen of a television transmitting tube or the like included in housing 6, the transmitting tube being associated with a television transmitter in well-known manner. The housing 6 and its contents will be referred to below as a "camera." The above elements are conveniently arranged in line on an optical bench 7 which may be mobile or fixed according to requirements. In the arrangement shown the elements 4 and 5 are housed in an extension of the housing 6, bellows being provided at 8 to permit the relative motion between the camera 6 (including the lens 5) and the lens 4. From a depending portion 9 of the housing 6 located immediately below lens 4 extends a rod 10 on which the holders for the lens 2 and slide 3 are slidably mounted as shown. The lamp housing 1 is fixed on the end of the rod 10.

The holder for the slide 3 is provided with a depending portion 11 which passes through slot 12 in the bench 7 and engages in a slot 13 in one arm of bell crank lever 14, shown dotted, under the bench 7. The bell crank lever 14, which is bent to a right angle, is pivotally connected at its angle to the point 15 of the bench 7, the other arm being provided with a slot 16 which engages a pin 17 which passes through the slot 16 and a guiding slot in a bracket 18 secured to the bench and is rigidly secured by member 20 to the housing 6 which is free to travel over the limited range determined by the length of the slot in bracket 18. As will be more clearly explained with reference to Figure 2, the bell crank 14 is arranged so that upon variation of the position of the slide 3, for example by moving the slide holder, then the bell crank lever 14 is moved so as to cause the housing 6 and consequently the objective system 5 to move so that the lens 4 still focusses an image of the transparency at 3 on or in the objective 5, the magnification of the image being varied in accordance with the well-known optical principles as a separation between the transparency at 3 of the lens 4 is varied.

According to the invention, the beam produced by the lens 2 by which the transparency at 3 is illuminated is made convergent, the position of lens 2 being adjusted so that an image of the filament of the lamp in housing 1 is produced at the lens 4. With this arrangement it will be seen that as the transparency at 3 is moved towards the lens 4 the intensity of the light falling on the illuminated portion of the transparency increases. Likewise it will be realised that as the transparency at 3 approaches the lens 4 the magnification of the image produced in the objective system 5 increases and consequently the brightness of this image would tend to decrease if the transparency at 3 were illuminated with light of constant intensity. Thus, as the illuminating beam is convergent both the brightness of the illumination of the transparency and the magnification of the image will increase, as the transparency approaches the lens 4 so that the intensity of illumination of the image will tend to remain constant throughout the range of operation of the apparatus.

As mentioned above the operation of the bell crank lever 14 will be understood from the following description with reference to Figure 2 of the drawing. This figure is diagrammatic and the bell crank lever 14, shown in full lines, is represented as lying in the plane of the paper, P being the pivotal point of the lever and O representing the point of engagement of the extension 11 of the slide support 3 in the slot 13, and Q representing the point of engagement of the pin 17 associated with camera 6, in slot 16. The line OQ is parallel to the axis of the optical system including the elements 1 to 5 and for the purposes of this description line OQ may be regarded as lying along this axis, L representing the position of the fixed lens 4, F being the focal point of the lens 4 and I the position at which the image of the transparency at O is produced. The height of the object is represented by the length OO' in the figure and the height of the image is represented by the height II', the conventional construction consisting of rays O' L' I' and O' L I' respectively, for obtaining the image, being shown chain-dotted. The vertical scale of this construction has been much exaggerated in comparison with the the size of the bell crank lever 14 for the purposes of clarity.

The pivotal point P of the bell crank lever 14 is shown as located on the line bisecting the right angle L' LO at a distance $f$ from the line LO and consequently at the same distance from the line LL', where $f$ is the focal length of the lens 4 located at L. Now in accordance with the well-known construction for determining the focal length of a lens it will be seen that if the line OP is continued to cut the line LL' produced at H as shown in the figure then since LO and LL' constitute rectanglar axes, and since LO is the distance of the object at 3 from the lens 4, usually denoted by the symbol $u$, then the distance LH will be the distance of the image of the object from the lens L usually denoted by $v$, in other words LH is equal to LI. Now if the bell crank is bent at a right angle then it can be shown that the triangles PP'Q and PXH are congruent so that P'Q=XH. Now P' L=XL=$f$. Further we have seen that LH=LI and as LF=$f$ we see that FI=XH=P'Q. Thus since P'F=2$f$ and P' Q=FI, it follows that Q I=2$f$ thus if the distance between the point Q and the plane of the image in the objective system 5 is made equal to 2$f$ for example by providing a rigid member such as 20 of length 2$f$ then, when member 11 is actuated to move slide holder 3, the movement of bell crank lever 14 which results will cause objective 5 to move so that an image of the transparency at 3 continues to be produced therein. If the pivot 15 of the bell crank lever 14 is not located at the distance $f$ from the plane of the lens 4, as shown in Fig. 2, then the length of the fixed member 20 will have to be modified accordingly.

While the invention as described is used in connection with a transparency located at 3 it will be understood that the transparency may be replaced by a transparent object which is desired to be viewed which has considerable depth providing the projecting lens has sufficient depth of focus. The apparatus may also be adapted for use with opaque objects which are viewed by reflected light.

The slide holder 3 or other support for the object to be viewed may be made so that the position of the object may be adjusted as desired both in a horizontal and/or a vertical direction.

If desired, instead of making the position of the object and the image receiving device adjustable with respect to the projection optical system as in the case shown in the drawing, the object or the image receiving device might be arranged to be adjustable with respect to the image receiving device or the object as the case may be.

I claim:

1. An optical system for television apparatus comprising an object, an image receiving target, a lens system interposed between said object and image receiving target, a source of illumination, means for illuminating the object from the source of illumination, mechanical means coupling the object and the image receivng target so that movement of one of said objects and target results in a simultaneous movement of the other, said coupling means being so proportioned as to maintain focus of the object on said target, and said illuminating means being positioned with respect to said source and said object as to provide constant intensity of illumination upon the target regardless of the position of the object.

2. An optical system comprising an object, an image receiving target, a lens system interposed between said object and image receiving target, a source of illumination, means for illuminating the object from the source of illumination, pivoted mechanical means coupling the object and the image receiving target so that movement of one of said objects and target results in a simultaneous movement of the other, said coupling means being so proportioned as to maintain focus of the object on said target, and said illuminating means being positioned with respect to said source and said object as to provide constant intensity of illumination upon the target regardless of the position of the object.

3. An optical system comprising an object, an image receiving target, a lens system interposed between said object and image receiving target, a source of illumination, means for illuminating the object from the source of illumination, a pivoted bell crank coupling the object and the image receiving target so that movement of one of said objects and target results in a simultaneous movement of the other, said crank being so proportioned as to maintain focus of the object on said target, and said illuminating means being positioned with respect to said source and said object as to provide constant intensity of illumination upon the target regardless of the position of the object.

4. An optical system comprising an image receiving target, an object whose image is to be projected upon said target, a lens system positioned intermediate the object and said target, a source of illumination, means to illuminate the object from said source of illumination, a pivoted bell crank cam, means engaging the object and said cam whereby said object follows the movement of said cam, means engaging the image receiving target to said cam whereby said target follows the movement of said cam, said target and said object being positioned with respect to each other and said cam, whereby the sum of the distance between the points of engagment of both engaging means and twice the focal length of said lens system is a constant, and said illuminating means being positioned to maintain constant intensity of illumination on the target regardless of the postion of the object.

5. An optical projection system as claimed in claim 4 wherein said image receiving target is an electro-optical image transmission device.

CECIL OSWALD BROWNE.